O. WEFING.
FEED DEVICE FOR MEAT CUTTING OR MINCING MACHINES.
APPLICATION FILED JAN. 17, 1912.

1,032,258.

Patented July 9, 1912.
2 SHEETS—SHEET 2.

Witnesses:

Inventor
Otto Wefing
by

UNITED STATES PATENT OFFICE.

OTTO WEFING, OF ILMENAU, GERMANY.

FEED DEVICE FOR MEAT CUTTING OR MINCING MACHINES.

1,032,258.  Specification of Letters Patent.  Patented July 9, 1912.

Application filed January 17, 1912. Serial No. 671,737.

*To all whom it may concern:*

Be it known that I, OTTO WEFING, a subject of the German Emperor, residing at Ilmenau, Grand Duchy of Saxe-Weimar-Eisenach, Germany, have invented certain new and useful Improvements in Feed Devices for Meat Cutting or Mincing Machines, of which the following is a specification.

This invention relates to improvements in meat chopping or mincing machines of that type wherein an automatically-operable device or mechanism is provided to supply the material to the cutting mechanism and to thereby eliminate the dangerous and unsanitary practice of using the hand for this purpose.

The objects of the invention are to provide an apparatus in which the supply of material to the cutting mechanism is effected in a substantially continuous manner and without any undue packing or crushing of the material and in which the feeding mechanism is adapted without change to efficiently work on materials of different natures.

Other objects and advantages will appear as the description proceeds.

Figure 1:
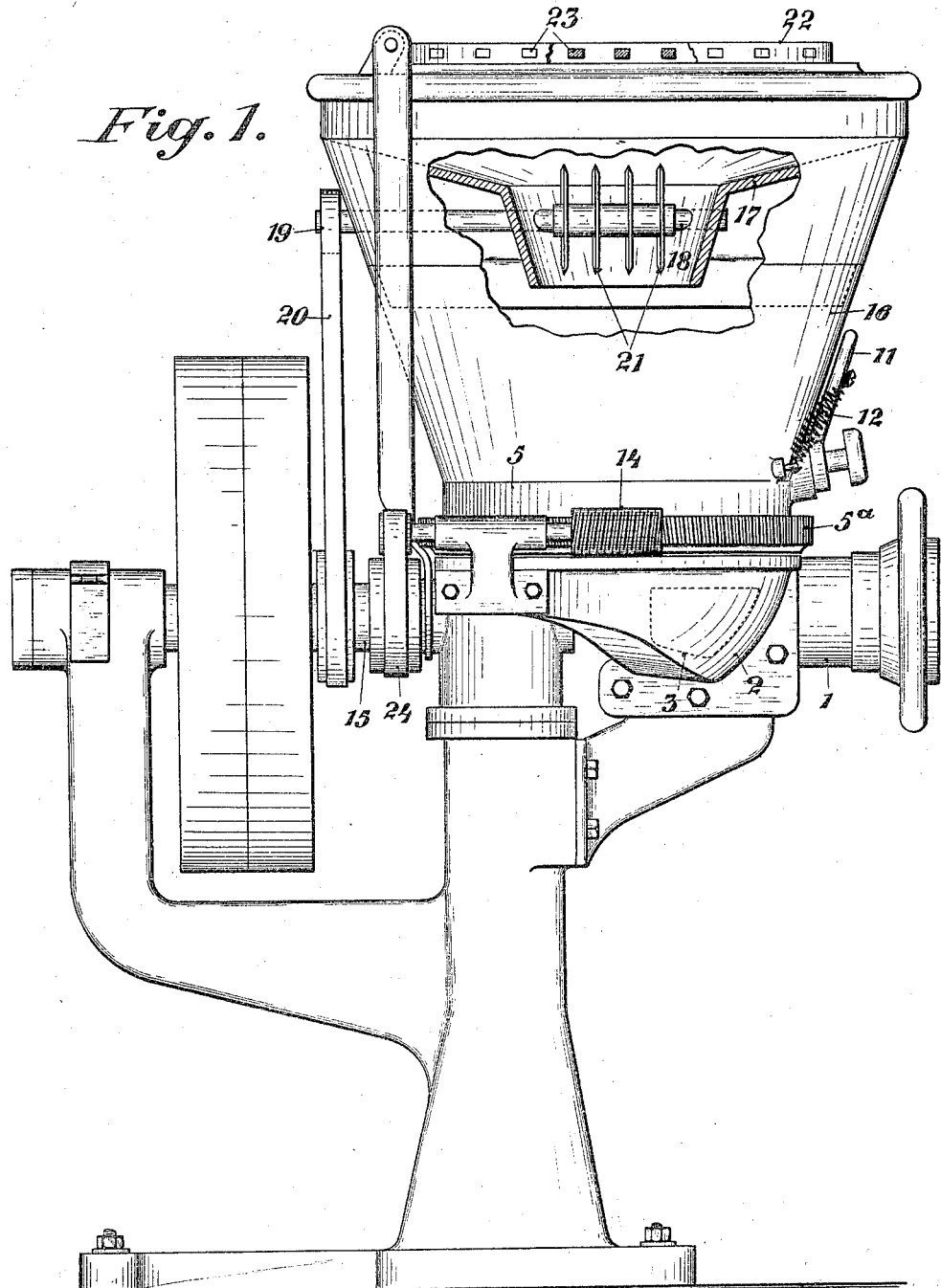
Figure 2:
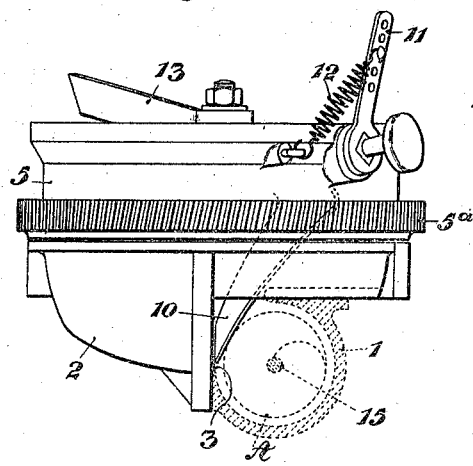
Figure 3:
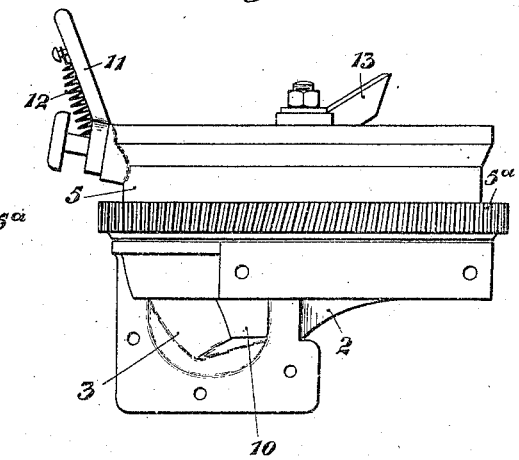
Figure 4:
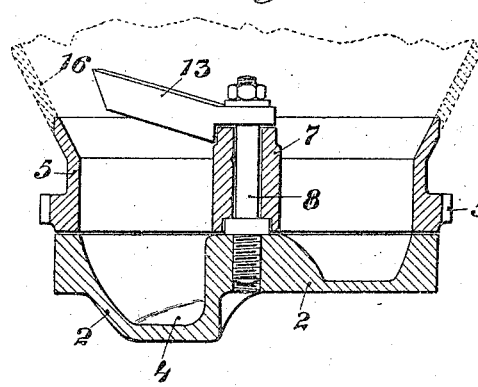
Figure 5:
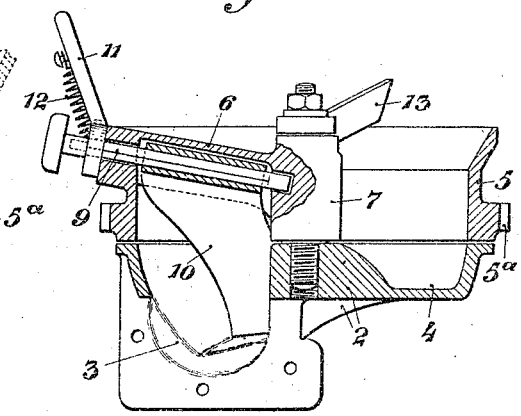
Figure 6:
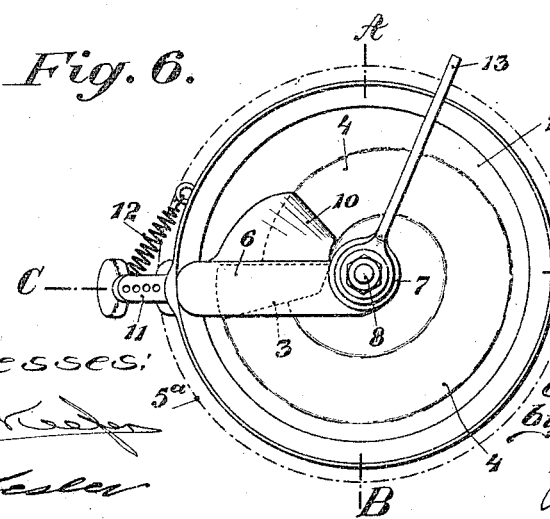

A construction according to my invention is illustrated by way of example in the accompanying drawing in which:

Figure 1 shows a side elevation, partly in section, through a meat mincing machine, Figs. 2-6 show the device for the automatic supply of the material to the feed opening, Fig. 2 being a front elevation of the bottom portion of the hopper, Fig. 3 a side elevation thereof, Fig. 4 a longitudinal section on the line A—B of Fig. 6, Fig. 5 a section on the line C—D of Fig. 6, and Fig. 6 a plan of the device shown in Fig. 1.

The mincer is situated in the casing 1 and consists as usual of a conveyer worm A with the usual knives and the like. The casing 1 is secured to the bottom portion 2 of the hopper and provided with a lateral inlet or mincer opening 3. The bottom portion 2 of the hopper is provided with a spirally descending bottom 4, the lowest point of which is situated in front of the feed opening 3 of the mincer. On the bottom portion 2 of the hopper is mounted an annular central part 5 connected by means of a bridge 6 to the central sleeve 7 surrounding the bolt 8 centrally inserted in the bottom portion 2, the part 5 being rotatable about the said bolt 8.

Below the bridge 6 is arranged a bolt 9 carrying the blade 10. The blade 10 is pressed by means of the lever 11 engaging with the bolt 9, and of a spring 12 secured to the said lever, against the bottom 4 of the lower portion 2 of the hopper. The bolt 8 is further provided with a fixed arm 13 under which the bridge 6 slides when the hopper part 5 is rotating, the said arm stripping off any pieces of meat that may be lying on the bridge 6.

The hopper portion 5 is provided with a peripheral worm wheel $5^a$ which constitutes an element of the gearing for rotating said hopper portion and is engaged by a worm 14, the latter, in turn, being driven from the main shaft 15 by a belt 24 or equivalent gear connection.

When the hopper 2, 5 is filled with pieces of meat, and the part 5 rotated, the blade 10 sliding on the bottom 4, seizes the material and pushes it forward. The blade 10 follows the bottom 4 descending spirally and finally presses the material across the feed opening 3 or directly against the conveyer worm A situated in the casing 1 which strips off the material from the blade 10 and seizes it at once (Fig. 2). During further rotation of the hopper part 5, the blade 10 turning about the axis of the bolt 9 in opposition to the action of the spring 12, arrives at the highest point of the bottom 4, situated above the casing 1, in order to repeat the process described.

If the material used in such mincing machines as described, has not been first cut, an automatic supply of material can be insured by arranging a separate device for preliminary cutting above the hopper portion 5 surmounted by a sheet metal hopper 16. The said preliminary cutting device consists either of circular knives or of rotating single knives driven in a suitable manner from the driving gear of the mincer, and effecting the preliminary cutting of the material.

One of the many possible constructions is shown in Fig. 1. Above the hopper 5, 16 is inserted another hopper 17 carrying a knife shaft 18, the driving pulley 19 of which is suitably driven, for instance by means of a belt 20 from the main spindle 15. The knife shaft 18 is arranged opposite a similar knife shaft which is also suitably driven. The knife shaft 18 is provided with circular knives 21 which can coöperate with a similar group of knives situated opposite, and thus subject to preliminary cutting the large pieces of material charged into the hopper 17, the said material, after having been cut in that manner, falling into the hopper 5 and being supplied to the mincer from that point in the manner already described.

The safety of working in mincing machines according to my invention is insured by rendering it unnecessary to put the hand into the charging hopper; in order however to make such introduction of the hand quite impossible as long as the mincer is working, and thus to avoid any accidents, a cover or lid 22 can be provided above the charging hopper 17, the said lid closing the hopper at the top and being preferably sub-divided by ribs 23 in such manner that it is impossible to pass the hand through the cover or lid in question.

What I claim is:

1. In a machine of the type set forth, the combination with a meat cutting mechanism, of a feeding mechanism comprising a hopper having an annularly-curved bottom feed way which terminates in an opening that communicates with the cutting mechanism, and a blade transverse to the feed way and continuously pressed thereon, the blade being relatively rotatable throughout the extent of said feed way, to advance the meat toward the opening.

2. In a machine of the type set forth, the combination with a meat cutting mechanism, of a feeding mechanism comprising a hopper having a spirally-curved bottom feed way which terminates at its lowest point in an opening that communicates with the cutting mechanism, a blade transverse to the feed way and having its lower edge in contact therewith, the blade being relatively rotatable throughout the extent of said feed way, and means for maintaining the contact of the lower edge of the blade and the feed way throughout the extent of the relative movement.

3. In a machine of the type set forth, the combination with a meat cutting mechanism, of a feeding mechanism comprising a hopper having a spirally-curved bottom feed way which terminates at its lowest point in an opening that communicates with the cutting mechanism, a pivotally-mounted blade spring-held in contact with the feed way and movable relatively to the feed way throughout the extent of the latter.

In testimony whereof I have hereunto set my hand in presence of two subscribing witnesses.

OTTO WEFING.

Witnesses:
  ERNST EBERHARDT,
  ALFRED HOFFMANN.

---

Copies of this patent may be obtained for five cents each, by addressing the "Commissioner of Patents, Washington, D. C."